United States Patent [19]

Kato et al.

[11] Patent Number: 5,393,625
[45] Date of Patent: Feb. 28, 1995

[54] ELECTROPHOTOLITHOGRAPHIC PRINTING PLATE PRECURSOR

[75] Inventors: Eiichi Kato; Seishi Kasai; Kazuo Ishii, all of Shizuoka, Japan

[73] Assignee: Fuji Photo Film Co., Ltd., Kanagawa, Japan

[21] Appl. No.: 181,243

[22] Filed: Jan. 13, 1994

[30] Foreign Application Priority Data

Jan. 14, 1993 [JP] Japan .................................. 5-020713

[51] Int. Cl.$^6$ ...................... G03G 5/087; G03G 5/09
[52] U.S. Cl. .......................................... 430/49; 430/91; 430/93; 430/96
[58] Field of Search .................... 430/49, 91, 92, 93, 430/96

[56] References Cited

U.S. PATENT DOCUMENTS

| | | | |
|---|---|---|---|
| 5,198,319 | 3/1993 | Kato | 430/49 X |
| 5,229,240 | 7/1993 | Kato et al. | 430/96 |
| 5,229,241 | 7/1993 | Kato et al. | 430/49 X |
| 5,242,772 | 9/1993 | Kato et al. | 430/49 |
| 5,258,249 | 11/1993 | Kato | 430/49 |

*Primary Examiner*—Roland Martin
*Attorney, Agent, or Firm*—Sughrue, Mion, Zinn, Macpeak & Seas

[57] ABSTRACT

Disclosed is electrophotolithographic plate precursor having on a conductive support at least one photoconductive layer containing at least a random copolymer binder resin (P) (i) having a weight average molecular weight of from $5 \times 10^4$ to $5 \times 10^5$, (ii) comprising (a) a polymer component comprising particular methacrylate or acrylate monomers, (b) a polymer component containing at least one particular polar group and (c) a polymer component having a Fedors' solution parameter of 9.0 or more and containing at least a particular aprotic polar group, and (iii) having at least a particular polar group at one end of the main chain of the copolymer. The plate precursor may be etched with a combination of an etchant and a wetting water both having no problem in the environmental sanitation, to be formed into an offset printing plate not generating background staining. The printing plate has high printing durability and has excellent rubbing resistance.

6 Claims, No Drawings

ELECTROPHOTOLITHOGRAPHIC PRINTING PLATE PRECURSOR

FIELD OF THE INVENTION

The present invention relates to an electrophotolithographic printing plate precursor using a photoconductive zinc oxide and, more precisely, to such an electrophotolithographic printing plate precursor of which the surface of the photoconductive layer has high mechanical strength and which has excellent printability (especially, background-staining resistance).

BACKGROUND OF THE INVENTION

Various kinds of offset plate precursors for direct photoengraving have been proposed and put to practical use these days. Typically, a technique of producing offset printing plates has been used widely in the field of light printing, in which a photoreceptor having, on the conductive support, a photoconductive layer consisting essentially of photoconductive grains of, for example, zinc oxide and a binder resin is first processed by ordinary electrophotography to form an highlyoleophilic toner image on its surface and thereafter the thus-processed surface is treated with an etchant to selectively render the non-image area of the surface hydrophilic.

To obtain good prints, it is necessary that an original is faithfully duplicated on an offset plate precursor, that the surface of the photoreceptor of the plate precursor is well compatible with an etchant, and that the non-image area in the image-duplicated surface is rendered sufficiently hydrophilic and has high water resistance. In addition, in actual printing with the printing plate, it is further necessary that the surface conductive layer having an image thereon is not peeled off, that the layer is well compatible with a wetting water, and that the hydrophilicity of the non-image area is well maintained so as not to cause background staining even when an increased number of prints are obtained by the printing.

It has already been known that the proportion of the zinc oxide and the binder resin in the photoconductive layer has an influence on the above-mentioned requirements. For instance, if the ratio of the binder resin to the zinc oxide grains in the photoconductive layer is reduced, the etchability of the surface of the photoconductive layer will be improved to cause no background staining, while, however, the internal cohesive force of the photoconductive layer itself will be lowered to worsen the printing durability due to the insufficiency of the mechanical strength of the layer. On the contrary, if the ratio of the binder resin to the same is increased, the printing durability will be improved, while, however, the background staining will be increased. Though, the background staining is a phenomenon that especially depends upon the etchability of the surface of the photoconductive layer, it has been clarified that the etchability is not influenced only by the proportion of the zinc oxide and the binder resin in the photoconductive layer but is also influenced noticeably by the kind of the binder resin used.

Especially in offset printing plates, the background staining to be caused by the insufficient etchability of the surface of the photoconductive layer is a serious problem, as mentioned above. In order to overcome the problem, therefore, various binder resins for zinc oxide that may improve the etchability of the surface of the photoconductive layer have been investigated and developed. For instance, JP-B 50-31011 (the term "JP-B" as referred to herein means an "examined Japanese patent publication") mentions that a combination of a copolymer resin obtained by copolymerization of (meth)acrylate monomers and other monomers in the presence of fumaric acid and having a weight average molecular weight of from $1.8 \times 10^4$ to $10 \times 10^4$ and a glass transition point (Tg) of from 10° C. to 80° C. and a copolymer comprising (meth)acrylate monomers and monomers other than fumaric acid is effective in improving the etchability of photoconductive layers; JP-A 53-54027 (the term "JP-A" as referred to herein means an "unexamined published Japanese patent application") mentions that a ternary copolymer containing substituted (meth)acrylates having a carboxylic group separated from the ester bond by at least seven carbon atoms is effective in the same; JP-A 54-20735 and 57-202544 mention that a tetranary or pentanary copolymer containing acrylic acids and hydroxyethyl (meth)acrylates is effective in the same; and JP-A 58-68046 mentions that a ternary copolymer containing (meth)acrylates substituted by an alkyl group having from 6 to 12 carbon atoms and vinyl monomers containing a carboxylic acid residue is effective in the same.

However, even the above-mentioned resins that have been said to be effective in improving the etchability of photoconductive layers were still unsatisfactory with respect to the background staining resistance and the printing durability, when they were tested and actually used.

Recently, a technique of employing, as a binder resin for a photoconductive zinc oxide, a combination of a low polymer having a particular polar group such as a carboxyl, sulfo or phosphono group as the substituent in the main chain of the polymer or at one end of the same and having a weight average molecular weight of not more than $2 \times 10^4$ (for example, refer to JP-A 63-217354, and U.S. Pat. Nos. 4,968,572, 4,954,407, 5,134,051, 5,154,997) and various middle or high copolymers having a weight average molecular weight of not less than $3 \times 10^4$ has been disclosed to improve the etchability of the photoconductive layer with increasing the mechanical strength of the whole photoconductive layer and improving the printing durability of the same, over the photoconductive layer containing a conventional binder resin.

As the middle or high copolymers, for example, known are random copolymers containing at least methacrylates and carboxyl group-containing monomers (for example, refer to JP-A 63-220148, and U.S. Pat. No. 4,968,572), random copolymers containing thermosetting/photosetting group-containing comonomers, which are hardened in the presence of a crosslinking compound after the photoconductive layer has been formed (for example, refer to JP-A 1-100554, 1-211766, 1-102573), etc.

The disclosed electrophotolithographic printing plate precursors were excellent, when actually used, in the reproducibility of the duplicated image. In addition, when the precursors were etched to give offset printing plates and were used in actual printing, the printing plates were excellent as having improved background staining resistance and printing durability.

On the other hand, recently, a so-called full-automatic printing machine equipped with an etching device has been popularized for the purpose of improving the printing operation efficiency. With the popularization, the smoothness of the back surface of the support of the electrophotolithographic plate precursor to be fitted to the device has become restrained so as to prevent the precursor from slipping, in order that the photoengraved plate (having thereon a duplicated image formed by electrophotoengraving) may be suitably located at a determined position in the full-automatic printing machine.

It has been found, however, even a photoreceptor having a photoconductive layer on the support having such a particular back surface often causes background staining if its photosensitive surface is strongly rubbed against the back surface of the support.

The problem was especially remarkable when a photoreceptor was fed to an electrophotoengraving machine as a sheet photoreceptor.

As well known, the surface of the lithographic plate precursor using such a photoconductive zinc oxide is rendered hydrophilic by chemically treating the zinc oxide with an etchant under an acidic condition. As an etchant of high ability, one containing yellow prussiate of potash (potassium ferrocyanide) as the main component has been essentially employed in practical use.

Since it has become necessary to restrict the method of treating the waste liquid derived from the etchant containing yellow prussiate of potash as the main component, it is desired to use a different etchant containing phytic acid as the main component. However, as being inferior to the former etchant containing yellow prussiate of potash with respect to the etchability, the latter etchant often causes black pepper stains in the non-image area and is therefore limitative with respect to the suitable etching conditions therewith. Under the situation, the improvement of the capacity of an etchant consisting essentially of phytic acid is desired and, in addition, the development of a lithographic plate precursor using a photoconductive zinc oxide, which may be well etched with such an etchant consisting essentially phytic acid, is also desired.

SUMMARY OF THE INVENTION

The present invention is to overcome the various drawbacks in the above-mentioned conventional electro-photolithographic plate precursors.

Accordingly, the first object of the present invention is to provide a lithographic plate precursor which may be etched suitably to give an offset printing plate which will not generate background staining (fog) on the entire surface of prints and pepper stains locally thereon.

The second object of the present invention is to provide a lithographic plate precursor which has high printing durability (or has excellent rubbing resistance) and does not cause background staining, even though using a support that may be suitably fed to a full-automatic offset printing machine.

The third object of the present invention is to provide a lithographic plate precursor which may be etched with a combination of an etchant and a wetting water both having no problem in the environmental sanitation. The printing plate thus formed after the etching has high printing durability.

In order to attain the above-mentioned objects, the present invention provides an electrophotolithographic plate precursor having on a conductive support at least one photoconductive layer containing at least a photoconductive zinc oxide, a color sensitizing and a binder resin(s), in which the binder resin(s) contains at least one binder resin (P): the binder resin (P) being a random copolymer (i) having a weight average molecular weight of from $5 \times 10^4$ to $5 \times 10^5$, (ii) comprising (a) a polymer constituting component (hereafter simply referred to "polymer component") having repeating units of the following formula (I) in an amount of 50% by weight or more, (b) a polymer component containing at least one polar group selected from the group consisting of $-PO_3H_2$, $-COOH$, $-SO_3H$, $-SO_2H$ and cyclic acid anhydride-containing groups, in an amount of from 0.1 to 10% by weight, and (c) a polymer component having a Fedors' solution parameter of 9.0 or more and containing at least one aprotic polar group, in an amount of from 0.5 to 10% by weight, and (iii) having at least one polar group selected from the group consisting of $-PO_3H_2$, $-COOH$, $-SO_3H$, $-SO_2H$ and cyclic acid anhydride-containing groups at one end of the main chain of the copolymer:

wherein $a_1$ represents a hydrogen atom or a methyl group; and R represents an alkyl group having from 1 to 4 carbon atoms and optionally substituted by aromatic group(s) or represents an aromatic group.

Preferably, the content of the binder resin (P) is 50% by weight or more, relative to the total weight of the binder resin(s) in the photoconductive layer. More preferably, it is from 60 to 90% by weight relative to the same.

DETAILED DESCRIPTION OF THE INVENTION

The binder resins (P) for use in the present invention will be explained in detail hereunder.

The resin (P) has a weight average molecular weight of from $5 \times 10^4$ to $5 \times 10^5$, preferably from $6 \times 10^4$ to $3 \times 10^5$, and has a glass transition point of preferably from 10° C. to 120° C., more preferably from 20° C. to 110° C.

If the molecular weight of the resin (P) is less than $5 \times 10^4$, the rubbing resistance of the surface of the photoconductive layer of the plate precursor of the present invention is lowered, but if it is more than $5 \times 10^5$, the etchability of the same is deteriorated.

The random copolymer (P) for use in the present invention may contain another polymer component (d) along with the constitutive polymer components (a), (b) and (c). The ratio of (a)/(b)/(c)/(d) may be from (50 to 99.4)/(0.1 to 10)/(0.5 to 10)/(40 to 0), preferably from (70 to 98.8)/(0.2 to 10)/(1 to 8)/(20 to 0), by weight.

If the contents of the polymer components (a) and (b) in the resin (P) are less than the defined ranges, the electrophotographic properties (especially, the initial potential and the dark attenuation retentiveness (dark decay)) of the plate precursor of the present invention are deteriorated and additionally the film strength of the photoconductive layer of the plate precursor will also be lowered.

If the content of the polymer component (b) is more than the defined range, the etchability of the plate precursor is deteriorated.

On the other hand, if the content of the polymer component (c) is less than 0.5% by weight, the etchability is lowered, but if it is more than 10% by weight, the electrophotographic properties are deteriorated.

If the content of the optional polymer component (d) is more than 40% by weight, the effects of the resin (P) decrease.

If the random copolymer (P) in the photoconductive layer of the plate precursor of the present invention does not have at least one polar group at one end of its main chain, the reproducibility of the plate precursor of reproducing a duplicated image (especially, the high-precision image area thereof) becomes unsatisfactory and additionally the rubbing resistance of the layer is lowered.

The polymer components that constitute the resin (P) will be explained in detail hereunder. The polymer component (a) may be represented by general formula (I) as its repeating units.

where $a_1$ is a hydrogen atom or a methyl group; and R is an alkyl group having from 1 to 4 carbon atoms and optionally substituted by aromatic group(s) or is an aromatic group.

The aromatic group is preferably a benzene ring or a naphthalene ring. Preferred examples of the R include a methyl group, an ethyl group, a propyl group, a butyl group, a benzyl group, a phenethyl group, a 3-phenylpropyl group, an α-methylbenzyl group, an α-methylphenethyl group, a 4-phenylpropyl group, a naphthylmethyl group, a naphthylethyl group, a naphthylpropyl group, a phenyl group, a naphthyl group, a chlorophenyl group, a bromophenyl group, a dichlorophenyl group, a chloromethylphenyl group, a methylphenyl group, a cyanophenyl group, an acetylphenyl group, a methoxyphenyl group, an ethoxyphenyl group, a methoxycarbonylphenyl group, an ethoxycarbonylphenyl group, etc.

The polymer component (b) has at least one polar group selected from the group consisting of —COOH, —SO$_3$H, —PO$_3$H$_2$, —SO$_2$H and cyclic acid anhydride-containing groups. The cyclic acid anhydride-containing group is a group containing at least one cyclic acid anhydride. The cyclic acid anhydride that may be in the group includes aliphatic dicarboxylic acid anhydrides and aromatic dicarboxylic acid anhydrides.

Examples of aliphatic dicarboxylic acid anhydrides include succinic anhydride ring, glutaconic anhydride ring, maleic anhydride ring, cyclopentane-1,2-dicarboxylic acid arthydride ring, cyclohexane-1,2-dicarboxylic acid anhydride ring, cyclohexene-1,2-dicarboxylic acid anhydride ring, 2,3-bicyclo[2,2,2]octanedicarboxylic acid anhydride ring, etc. The rings may optionally be substituted, for example, by halogen atom(s) such as chlorine atom, bromine atom, etc. and/or alkyl group(s) such as methyl group, ethyl group, butyl group, hexyl group, etc.

Examples of aromatic dicarboxylic acid anhydrides include phthalic anhydride ring, naphthalene-dicarboxylic acid anhydride ring, pyridine-dicarboxylic acid arthydride ring, thiophene-dicarboxylic acid anhydride ring, etc. The rings may optionally be substituted, for example, by halogen atom(s) such as chlorine atom, bromine atom, etc., alkyl group(s) such as methyl group, ethyl group, propyl group, butyl group, etc., hydroxyl group, cyano group, nitro group, and/or alk-oxycarbonyl group(s) where the alkoxy group is, for example, methoxy or ethoxy group, etc.

The above-mentioned "polymer component (b) having at least one particular polar group" may be derived from any vinyl compounds that have the polar group(s) and are copolymerizable with the corresponding vinyl monomer compounds forming the polymer component (a) of formula (I).

For instance, such vinyl compounds forming the polymer component (b) are described in *High Polymer Data Handbook* (for Elementary Course), edited by the High Polymer Society of Japan and published by Baifukan Publishing Co. in 1986. Typically mentioned, as examples of the vinyl compounds, are acrylic acid, α- and/or β-substituted acrylic acids (e.g., α-acetoxy-, α-acetoxy-methyl-, α-(2-amino)methyl-, α-chloro, α-bromo-, α-fluoro-, α-tributylsilyl, α-cyano, β-chloro, β-bromo-, α-chloro-β-methoxy-, α,β-dichloro-acrylic acids), meth-acrylic acid, itaconic acid, semi-esters of itaconic acid, itaconic acid semi-amides, crotonic acid, 2-alkenyl-carboxylic acids (e.g., 2-pentenoic acid, 2-methyl-2-hexenoic acid, 2-octenoic acid, 4-methyl-2-hexenoic acid, 4-ethyl-2-octenoic acid), maleic acid, semi-esters of maleic acid, maleic acid semi-amides, vinylbenzene-carboxylic acid, vinylbenzenesulfonic acid, vinylsulfonic acid, vinylphosphonic acid, semi-ester derivatives of vinyl- or allyl-dicarboxylic acids, and ester or amide derivatives of the carboxylic acids or sulfonic acids, all being substituted by the polar group(s).

Specific examples of the polymer component (b) having the polar group(s) are mentioned below, where $a_1$ and $a_2$ each are H or CH$_3$, f is an integer of from 1 to 3, g is an integer of from 2 to 11, h is an integer of from 1 to 11, i is an integer of from 2 to 4, and j is an integer of from 2 to 10.

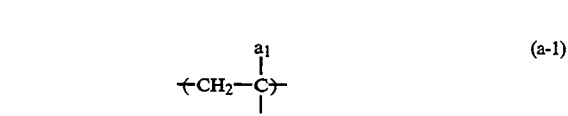 (a-1)

 (a-2)

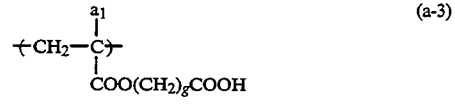 (a-3)

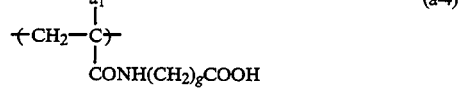 (a-4)

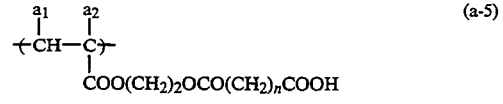 (a-5)

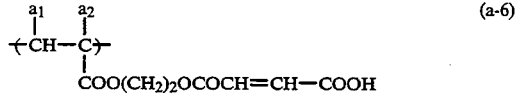 (a-6)

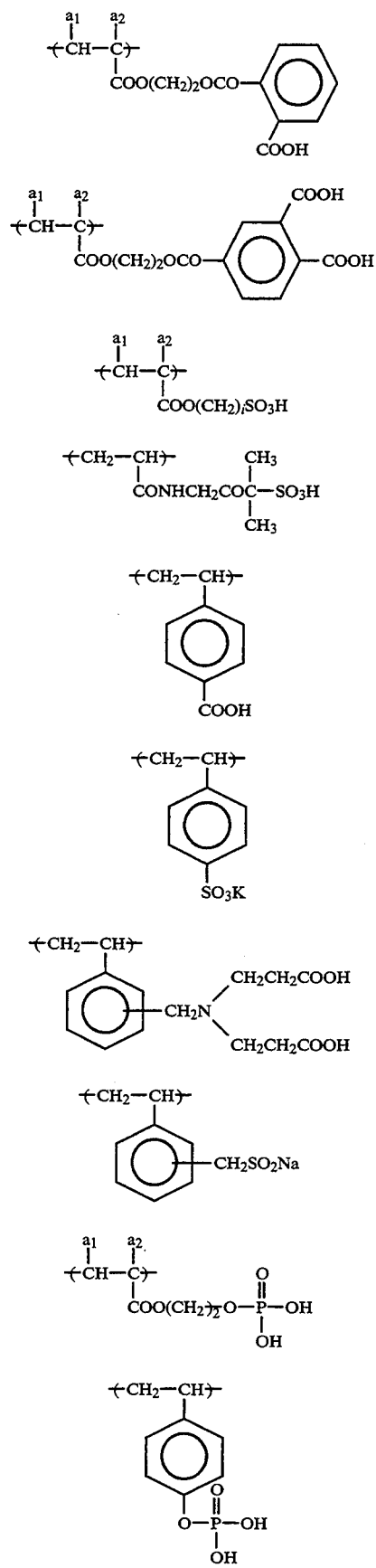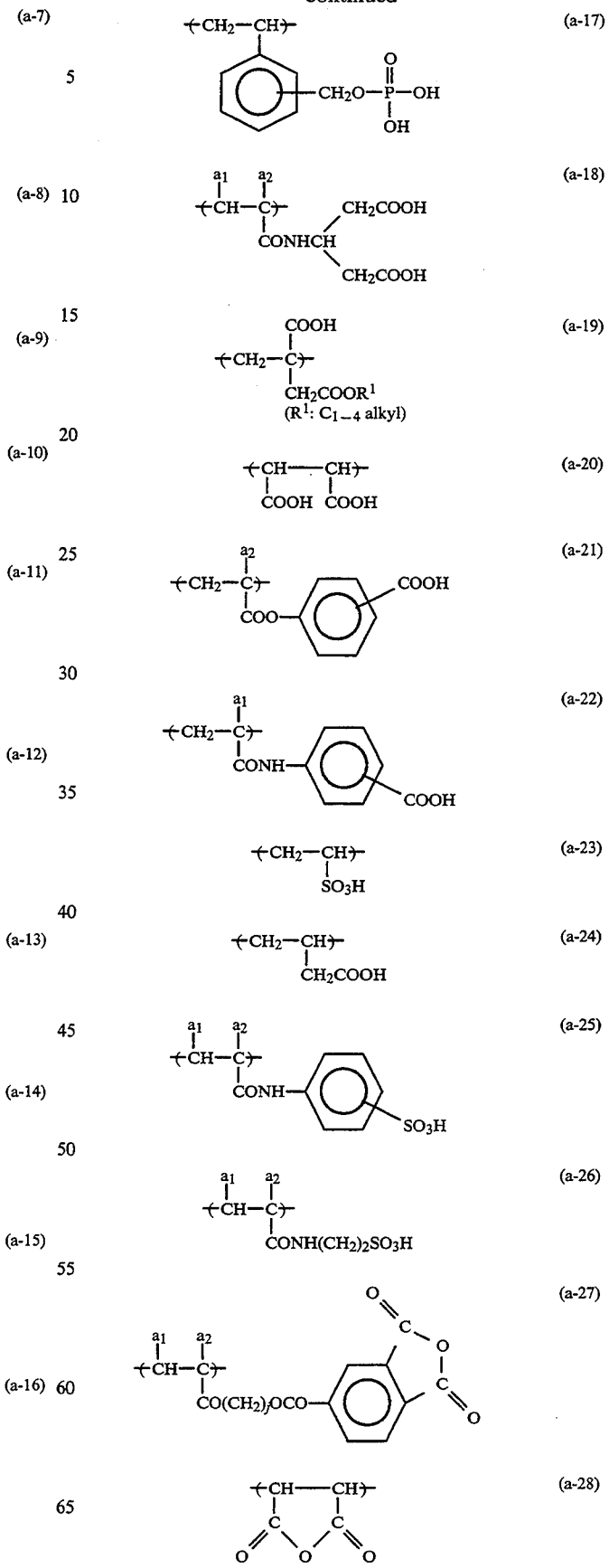

Next, the polymer component (c) which is indispensable in the resin (P) for use in the present invention will be explained below.

The polymer component (c) has a Fedors' solution parameter (hereinafter referred to as "SP") of 9.0 or more and is composed of repeating units derived from monomers having at least one aprotic polar group and at least one addition-polymerizable double bond.

More preferably, the component (c) has SP of 9.5 or more. The Fedors' solution parameter as referred to herein indicates a value to be calculated on the basis of the equation of a solution parameter, which is known as described in R. F. Fedors, *Polym. Eng. Sci.*, 14, 147 (1974).

Specifically, the component (c) may be of any polymers to be derived from monomers which have at least one aprotic polar group and have SP of 9.0 or more and which are copolymerizable with the corresponding monomers that form the polymer component (a) and the polymer component (b). As examples of the polymer component (c), mentioned are ester derivatives or amide derivatives having SP of 9.0 or more and comprising repeating units derived from monomers having at least one polar group such as —COOH, —SO$_3$H, —PO$_3$H$_2$ or the like, that have been referred to hereinabove for the polymer component (b). The polymer compound (c) differs from polymer component (a) in that the latter has SP of less than 9.0.

It is preferred that the ester moiety in esters of acrylic acid, methacrylic acid, crotonic acid and the like, diesters of maleic acid, itaconic acid and the like and esters of vinylbenzene-carboxylic acids, for the monomers of the component (c), contains a hydrocarbon residual group having from 1 to 8 carbon atoms and substituted by at least one functional group selected from halogen atoms (e.g., fluorine, chlorine, bromine, iodine), cyano group, nitro group, formyl group and heterocyclic groups containing, for example, a tetrahydrofuran ring, a tetrahydropyran ring, a thiophene ring, a pyridine ring, an imidazole ring, a quinoline ring, a maleinimide ring, a morpholine ring, a dioxane ring, a piperidine ring, an oxazine ring, a pyrrolidone ring, etc. The hydrocarbon residual group includes, for example, a methyl group, an ethyl group, a propyl group, a butyl group, a pentyl group, a hexyl group, a heptyl group, an octyl group, a cyclopentyl group, a cyclohexyl group, a benzyl group, a phenethyl group, a phenyl group, etc. It is also preferred that the ester moiety contains an organic residue that has 18 or less carbon atoms as the total carbons constituting the chain length of the residue and contains at least one divalent linking group selected from for example, —O—, —S—, —CO—, —OCO—, —COO—, —N(r$_1$)— —SO$_2$—, —NHCOO—, —NHCONH—, —CON(r$_1$)—, —SO$_2$N(r$_1$)—, —P(=O)(r$_2$)O—, —Si(R$_3$)(r$_4$)—, etc. r$_1$ is a hydrogen atom or a hydrocarbon residual group; r$_2$ is a hydrocarbon residual group or —OR' (where R' is a hydrocarbon residual group); and r$_3$ and r$_4$ may be same or different and each represent a hydrocarbon residual group. For the hydrocarbon residual groups for r$_1$ to r$_4$, those mentioned hereinabove for the substituents of the ester moiety are referred to.

As other preferred examples of the polymer component (c), also mentioned are heterocyclic ring-containing monomers such as, for example, those described in *High Polymer Data Handbook* (for Elementary Course), edited by the High Polymer Society of Japan and published by Baifu-kan Publishing Co. in 1986.

Still other preferred examples of the polymer component (c) are those derived from monomers such as vinyl methyl ketone, vinyl ethyl ketone, acrylonitrile, methacrylonitrile, acrolein, vinyl methyl ether, etc.

The resin (P) for use in the present invention may contain another polymer component (d) along with the above-mentioned polymer components (a) to (c). The additional polymer component (d) may be one derived from monomers, except those of the polymer components (a) to (c), that are copolymerizable with the monomers of the components (a) to (c).

Examples of the monomers forming the polymer component (d) include alkyl methacrylates or acrylates of forming the repeating unit of formula (I), in which the alkyl ester moiety has from 5 to 12 carbon atoms, as well as ester derivatives of crotonic acid, itaconic acid and the like, vinyl esters or allyl esters of aliphatic carboxylic acids having from 1 to 12 carbon atoms, styrene and its derivatives (e.g., vinyltoluene, ethylstyrene, propylstyrene, butylstyrene, chlorostyrene, dimethylstyrene, dichlorostyrene, methoxystyrene, ethoxystyrene, propoxystyrene, butoxystyrene, methoxycarbonylstyrene, ethoxycarbonylstyrene, methoxymethylstyrene, ethoxymethyl-styrene, butoxymethylstyrene), vinylnaphthalene and its derivatives (e.g., vinylchloronaphthalene, vinylmethyl-naphthalene), etc.

The resin (P) for use in the present invention has at least one polar group chosen from among the above-mentioned particular polar groups for the polymer component (b), as bonded directly to one end of the main chain of the copolymer composed of the above-mentioned polymer components or as bonded thereto via a linking group. The linking group may be a divalent organic residue, which is, for example, a divalent aliphatic or aromatic group optionally containing a bonding group selected from among —O—, —S—, —N(d$_1$)—, —SO—, —SO$_2$—, —COO—, —OCO—, —CONHCO—, —NHCOO—, —NHCONH—, —CON(d$_2$)—, —SO$_2$N(d$_3$)— and —Si(d$_4$)(d$_5$), or is an organic residue comprising the combination of such divalent groups. d$_1$ to d$_3$ have the same meanings as r$_1$, and D$_4$ and d$_5$ have the same meanings as r$_3$ and r$_4$.

Examples of the divalent aliphatic group include —[C(k$_1$)(k$_2$)]—, —[C(k$_1$)=C(k$_2$)]—, —(C≡C)—, —C$_6$H$_{10}$—, —C$_5$H$_8$—,

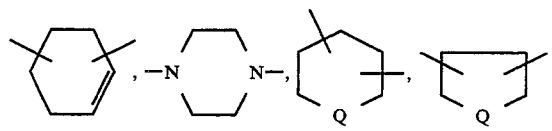

k$_1$ and k$_2$ are same or different and each represent a hydrogen atom, a halogen atom (e.g., fluorine, chlorine, bromine), or an alkyl group having from 1 to 12 carbon atoms (e.g., methyl, ethyl, propyl, chloromethyl, bromomethyl, butyl, hexyl, octyl, nonyl, decyl). Q represents —O—, —S— or —NR$_{20}$—, and R$_{20}$ is an alkyl group having from 1 to 4 carbon atoms, or is —CH$_2$Cl or —CH$_2$Br.

Examples of the divalent aromatic group include benzene ring residual groups, naphthalene ring residual groups, and 5- or 6-membered heterocyclic groups (having at least one hetero atom selected from among oxygen, sulfur and nitrogen atoms). The groups may optionally be substituted by, for example, one or more substituents selected from halogen atoms (e.g., fluorine, chlorine, bromine), alkyl groups having from 1 to 8 carbon atoms (e.g., methyl, ethyl, propyl, butyl, hexyl, octyl), and alkoxy groups having from 1 to 6 carbon atoms (e.g., methoxy, ethoxy, propoxy, butoxy).

Examples of the heterocyclic group include a furan ring, a thiophene ring, a pyridine ring, a pyrazine ring, a piperazine ring, a tetrahydrofuran ring, a pyrrole ring, a tetrahydropyran ring, a 1,3-oxazoline ring, etc.

The polar group may easily be bonded to one end of the main chain of the copolymer (P) by various known methods. For example, employable are a method of allowing various reagents to react on one end of a living polymer to be obtained by anionic polymerization (ionic polymerization method); a method of radical polymerization using a polymerization initiator and/or a chain transfer agent containing the particular polar group in the molecule (radical polymerization method); a method of polymerization under exposure to light, using, as the initiator, a dithiocarbamate or xanthate compound containing the particular polar group in the molecule (photoinferter method); and a method of converting a polymer having a reactive group (e.g., amino, halogen, epoxy, acid halide) at its one end, that has been obtained by the above-mentioned ionic polymerization or radical polymerization, to a different polymer having the particular polar group at the one end by polymeric reaction.

Of them, preferred is the radical polymerization method using a polymerization initiator containing the particular polar group in the molecule. This is because the production of the resin (P) may be conducted simply by the method, the production costs for producing the resin (P) by the method are low, and the regularity of the structure of the copolymer resin (P) to be obtained by the method is good.

The amount of the chain transfer agent and the polymerization initiator to be used in the method may be from 0.1 to 10 parts by weight, preferably from 0.2 to 5 parts by weight, per 100 parts by weight of the total weight of the monomers to be polymerized.

The photoconductive layer of the lithographic plate precursor of the present invention preferably contains, along with the resin (P), additional methacrylic or acrylic binder resin(s) other than the resin (P). Such methacrylic or acrylic resins are polymers containing, as the repeating units, methacrylate or acrylate components, and they have a weight average molecular weight of from $2 \times 10^4$ to $1 \times 10^5$, preferably from $3 \times 10^4$ to $8 \times 10^4$. Preferred examples of such methacrylic or acrylic resins include random copolymers composed of at least a monofunctional monomer selected from methacrylates (e.g., methacrylates substituted by alkyl group(s) having from 1 to 4 carbon atoms) and acrylates (e.g., acrylates substituted by alkyl group(s) having from 1 to 4 carbon atoms) and a monofunctional monomer that has at least one polar group selected from —COOH, —SO$_3$H, —PO$_3$H$_2$ and cyclic acid anhydride-containing groups and that is copolymerizable with the (meth)acrylates, the content of the latter monofunctional monomer component being from 1 to 5 parts by weight per 100 parts by weight of the total weight of the copolymer. The proportion of the methacrylic or acrylic resin(s) to the resin (P) in the photoconductive layer is preferably within the range of from 5/95 to 50/50, more preferably from 10/90 to 40/60, by weight.

The photoconductive layer of the lithographic plate precursor of the present invention may optionally contain other binder resin(s), if desired. Specifically mentioned, as such additional binder resins, are vinyl chloride-vinyl acetate copolymers, styrene-butadiene copolymers, vinyl acetate-styrene copolymers, polyvinylbutyrals, alkyd resins, silicone resins, epoxy resins, epoxy-ester resins, polyester resins, etc.

Typical examples of the resins are described in, for example, R. Shibata & J. Ishiwata, *High Polymers*, Vol. 17, p. 278 (1968); H. Miyamoto & H. Takei, *Imaging*, No. 8, p. 9 (1973); K. Nakamura, *Practical Techniques for Binders for Insulating Materials*, Chap. 10, published by C. H. C. in 1985; D. D. Tart & S. C. Heidecker, *Tappi*, 49 (No. 10), 439 (1966); E. S. Baltazzi, R. G. Blanclotte et al., *Photo. Sci. Eng.*, 16 (No. 5), 354 (1972); Gwen Chan K., I. Shimizu & E. Inoue, *Journal of the Electrophotographic Society of Japan*, 18 (No. 2), 28 (1980); JP-B 50-31011; and JP-A 53-54027, 54-20735, 57-202544, 58-68046, etc. However, the content of the resin(s) in the layer shall be not more than 30 parts by weight, preferably not more than 20 parts by weight, per 100 parts by weight of the total weight of all the binder resins in the layer.

The total amount of the binder resins to be in the photoconductive layer of the lithographic plate precursor of the present invention is preferably from 10 parts by weight to 40 parts by weight, more preferably from 15 parts by weight to 25 parts by weight, per 100 parts by weight of the photoconductive zinc oxide in the layer.

If the total amount of the binder resins in the layer is less than 10 parts by weight, it may be difficult to maintain the film strength of the photoconductive layer. On the other hand, if it is more than 40 parts by weight, the electrostatic characteristic of the layer may be deteriorated so that the duplicated image may be deteriorated in actual imaging. In addition, in such a case, the etchability of the layer for making the plate precursor to an offset printing plate may be lowered and the stains of the prints tend to increase.

The photoconductive zinc oxide for use in the present invention may be of any conventional ones known in this technical field. It includes, for example, not only pure zinc oxide but also acid-treated zinc oxides, zinc oxides pre-treated with dyes, kneaded and re-ground zinc oxides (so-called pressed zinc oxides), etc.; nevertheless it is not specifically defined.

The photoconductive layer of the lithographic plate precursor of the present invention contains one or more color sensitizing dyes. For instance, usable are carbonium dyes, diphenylmethane dyes, triphenylmethane dyes, xanthene dyes, phthalein dyes, polymethine dyes (e.g., oxonole dyes, merocyanine dyes, cyanine dyes, rhodacyanine dyes, styryl dyes), phthalocyanine dyes (optionally containing metal(s)) and others, such as those described or referred to in H. Miyamoto & H. Takei, *Imaging*, No. 8, p. 12 (1973); C. J. Young et al., *RCA Review*, 15, 469 (1954); K. Kiyota et al., *Journal of the Electric Communication Society of Japan*, J63-C (No. 2), 97 (1980); Y. Harazaki et al., *Journal of Engineering Science*, 66, 78 and 188 (1963); T. Tani, *Journal of the Photographic Society of Japan*, 35, 208 (1972), etc.

More precisely, carbonium dyes, triphenylmethane dyes, xanthene dyes and phthalein dyes which are usable the present invention are essentially described in JP-B 51-452; JP-A 50-90334, 50-114227, 53-39130, 53-82353; U.S. Pat. Nos. 3,052,540, 4,054,450; and JP-A 57-16456.

As polymethine dyes such as oxonole dyes, merocyanine dyes, cyanine dyes, rhodacyanine dyes, etc., those described in F. M. Harmmer, *The Cyanine Dyes and Related Compounds* are usable in the present invention. More precisely, the dyes described in U.S. Pat. Nos. 3,047,384, 3,110,591, 3,121,008, 3,125,447, 3,128,179, 3,132,942, 3,622,317, British Patents 1,226,892, 1,309,274, 1,405,898, and JP-B 48-7814, 55-18892, etc. are usable.

Also usable in the present invention are polymethine dyes which sensitize colors of long waves of 700 nm or more falling within near infrared to infrared ranges, such as those described in JP-A 47-840, 47-44180, JP-B 51-41061, 49-5034, 49-45122, 57-46245, 56-35141, 57-157254, 61-26044, 61-27551, U.S. Pat. Nos. 3,619,154, 4,175,956, Research Disclosure (1982), No. 216, pp. 117-118, etc. The photoreceptor of the present invention is excellent in that it may contain plural kinds of sensitizing dyes and that its properties are difficult to change due to the combination of such combined sensitizing dyes. If desired, the photoreceptor may additionally contain various additives such as chemical sensitizers that are known usable for electrophotosensitive layers. Examples of such additives usable in the present invention include electron-accepting compounds such as those referred to in the section of general remarks in the above-mentioned *Imaging* (1973), No. 8, p. 12, and polyarylalkane compounds, hindered phenol compounds and p-phenylenediamine compounds such as those referred to in the section of general remarks in H. Komon et al., *Recent Development and Practical Use of Photoconductive Materials and Photoreceptors*, Chaps. 4 to 6, published by Japan Academic Information Co. in 1986.

Incorporation of chemical sensitizers into the photoreceptor of the present invention is especially preferred. Any of electron-accepting compounds mentioned above may be used in the present invention as chemical sensitizers. Especially preferred are acid anhydrides (e.g., phthalic anhydride, o-sulfophthalic anhydride, succinic anhydride, maleic anhydride, glutaric anhydride, maleic anhydride, cyclohexane-dicarboxylic acid anhydride, cyclohexene-dicarboxylic acid anhydride, naphthalene-dicarboxylic acid anhydride, heterocyclic-dicarboxylic acid anhydrides (where the heterocyclic moiety may be, for example, a thiophene ring, a furan ring, a pyridine ring, a quinoline ring, a tetrahydrothiophene ring, a pyrane ring, a pyrrole ring, an imidazole ring, a piperazine ring), norbornene-dicarboxylic acid arthydride, benzophenone-tetracarboxylic acid dianhydride, etc. These acid anhydrides may optionally be substituted by one or more substituents. Examples of substituents are a hydroxyl group, a thiol group, a carboxyl group, a sulfo group, a phosphono group, a cyano group, a formyl group, a nitro group, an amino group, a halogen atom, an acetyl group, a methanesulfonyl group, a benzenesulfonyl group, an alkoxy group, a phenoxy group, an alkylthio group, an acetamido group, an alkyl group (e.g., methyl, ethyl, propyl, butyl), an aralkyl group (e.g., benzyl, phenethyl), etc. In addition, also preferred are aliphatic or aromatic mono- or poly-carboxylic acids (for example, aliphatic carboxylic acids having 5 or more carbon atoms, benzoic acid, naphthalene-carboxylic acid, heterocyclic-carboxylic acids and their substituted compounds, such as the corresponding carboxylic acids of the above-mentioned acid anhydrides), as well as N-hydroxyimide compounds (for example, succinic acid imide, maleic acid imide, phthalic acid imide, cyclohexanimide, etc. as described in JP-A 3-136061). These compounds may be used singly or as a combination of them.

The lithographic plate precursor of the present invention may have the photoconductive layer on a known support. In general, it is desired that the support is of conductivity. Any conventional conductive support is usable in the present invention. Examples include substrates such as metal sheets, paper and plastic sheets that have been made conductive by impregnating low-resistance substances thereinto, substrates of which the back surface (opposite to the surface to be coated with light-sensitive layers) has been made conductive and additionally has been coated with at least one or more backing layers for the purpose of preventing them from curling, as well as the above-mentioned substrates of which the front surface has been coated with a water-resistant adhesive layer, the above-mentioned substrates of which the surface layer optionally has been fitted with at least one or more pre-coat layers, and laminates prepared by laminating an Al-deposited conductive plastic on paper.

Examples of conductive supports and conductive materials which may be used in the present invention are described in, for example, Y. Sakamoto, *Electrophotography*, 14 (No. 1), pp. 2–11 (1975); H. Moriga, *Handbook of Chemistry of Special Papers* (published by High Polymer Publishing, (1975); M. F. Hoover, *J. Macromol. Sci, Chem.*, A-4 (6), pp. 1327–1417 (1979), etc.

The lithographic plate precursor of the present invention may be produced by ordinary methods. Typically, the resin(s) of the present invention and optionally the above-mentioned additive(s) that has/have been dissolved or dispersed in a volatile hydrocarbon solvent having a boiling point of not higher than 200° C., and the resulting solution or dispersion is coated and dried on a conductive support to form thereon an electrophotosensitive layer (photoconductive layer). As the organic solvent to be used in the process, preferred are halogenated hydrocarbons having from 1 to 3 carbon atoms such as, for example, dichloromethane, chloroform, 1,2-dichloroethane, tetrachloroethane, dichloropropane and trichloroethane. Also preferred are aromatic hydrocarbons such as, for example, chlorobenzene, toluene, xylene and benzene; ketones such as, for example, acetone and 2-butanone; ethers such as, for example, tetrahydrofuran and ethylene glycol; and alcohols such as, for example, methanol, ethanol and isopropanol. Besides, various solvents and mixed solvents which are employable for preparing coating compositions may be used.

For producing a lithographic printing plate from the plate precursor of the present invention, a duplicated image is first formed on the surface of the precursor by ordinary methods, and the non-image area in the surface is etched. The etching is to etch the zinc oxide in the photoconductive layer of the precursor, which may be conducted by ordinary methods.

Either a dry developer or a liquid developer may be used in developing the photoreceptor of the present invention.

Since a highly fine duplicated image which is faithful to the original may be formed on the plate precursor of the present invention, a liquid developer is preferably used to attain the object of the present invention more effectively.

For etching the zinc oxide of the plate precursor of the present invention so as to make an offset printing plate, any known etching solution may be employed. For instance, employable are etchants containing, as the essential component, ferrocyanide compounds such as those described in JP-A 62-239158, 62-292492, 63-99993, 63-9994, JP-B 40-7334, 45-33683, JP-A 57-107889, JP-B 46-21244, 44-9045, 47-32681, 55-9315, and JP-A 52-101102. However, in view of the safety of etchants, the following etchants are preferably employed.

Typically, they are etchants consisting essentially of phytic acid compounds, such as those described in JP-B 43-28408, 45-24609, JP-A 51-103501, 54-10003, 53-83805, 53-83806, 53-127002, 54-44901, 56-2189, 57-2796, 57-20394, 59-207290; etchants consisting essentially of a metal-chelatable water-soluble polymers, such as those described in JP-B 38-9665, 39-22263, 40-763, 43-28404, 47-29642, JP-A 52-126302, 52-134501, 53-49506, 53-59502, 53-104302; etchants consisting essentially of metal complexes, such as those described in JP-A 53-104301, JP-B 55-15313, 54-41924; etchants consisting essentially of inorganic or organic acids, such as those described in JP-B 39-13702, 40-10308, 46-26124, JP-A 51-118501, 56-111695.

The present invention will be explained in more detail by means of the following examples, which, however, are not intended to restrict the scope of the present invention.

First, examples of synthesizing binder resins (P) are mentioned below.

SYNTHESIS EXAMPLE 1

Synthesis of Binder Resin (P-1):

A mixture comprising 68 g of methyl methacrylate, 28.5 g of methyl acrylate, 3 g of N-vinylpyrrolidone (having the SP of 11.4), 0.5 g of acrylic acid, 178 g of toluene and 22 g of ethanol was heated up to 70° C. with stirring in a nitrogen stream. 0.5 g of 2,2′-azobis(2-cyanovaleric acid) (A.C.V.) was added thereto and reacted for 4 hours. 0.2 g of A.C.V. was further added thereto before adjusting the temperature at 80° C. and reacted for further 2 hours. Afterwards, 0.2 g of A.C.V. was added thereto and reacted for 3 hours.

The thus-obtained polymer resin (P-1) of the following structural formula had a weight average molecular weight (Mw) of $9 \times 10^4$ (as measured by gel permeation chromatography (GPC) calibrated with polystyrene).

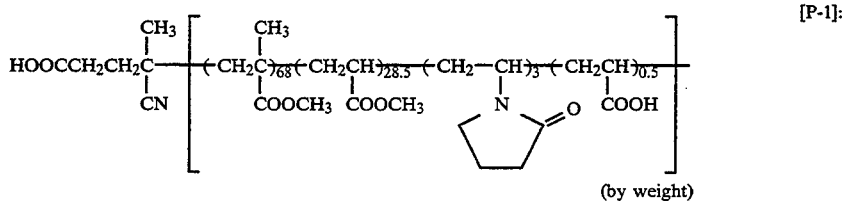

(by weight)

SYNTHESIS EXAMPLES 2 TO 10

Synthesis of Binder Resins (P-2) to (P-10):

Polymer resins (P-2) to (P-10) were prepared in the same manner as in Synthesis Example 1, except that the monomers and their amounts were changed to those as indicated in Table A below.

The thus-obtained polymers had Mw falling within the range of from $8 \times 10^4$ to $9 \times 10^4$.

TABLE A $$\text{HOOC(CH}_2)_2\overset{\overset{\displaystyle CH_3}{|}}{\underset{\underset{\displaystyle CN}{|}}{C}}-\left[\left(CH_2-\overset{\overset{\displaystyle CH_3}{|}}{\underset{\underset{\displaystyle COOR_1}{|}}{C}}\right)_k\left(CH_2CH\right)_l\left(X\right)_m\left(Y\right)_n\right]-T$$

| Synthesis Example No. | [P] | —R$_1$ | —T | —X— (SP) | —Y— | k/l/m/n (by weight) |
|---|---|---|---|---|---|---|
| 2 | P-2 | —CH$_3$ | —COOCH$_3$ | —CH$_2$CH—CONH$_2$ (14.2) | —CH$_2$C(CH$_3$)$_2$—COOH | 72.5/25/2.0/05 |
| 3 | P-3 | " | —COOC$_2$H$_5$ | —CH$_2$C(CH$_3$)$_2$—COO(CH$_2$)$_2$NHCOOCH$_3$ (10.7) | —CH$_2$C(CH$_3$)$_2$—COO(CH$_2$)$_2$SO$_3$H | 75.5/20/4/0.5 |
| 4 | P-4 | " | —COOCH$_3$ | —CH$_2$C(CH$_3$)$_2$—COO(CH$_2$)$_2$OCH$_3$ (9.04) | —CH$_2$C(CH$_3$)$_2$—COO(CH$_2$)$_2$OP(=O)(OH)OH | 61.4/30/8/0.6 |
| 5 | P-5 | " | " | —CH$_2$C(CH$_3$)$_2$—COO(CH$_2$)$_2$NHCONHC$_2$H$_5$ (11.4) | —CH$_2$C(CH$_3$)$_2$—COO(CH$_2$)$_2$OCO-C$_6$H$_3$(CO)$_2$O (phthalic anhydride ester) | 65/29/5/1.0 |
| 6 | P-6 | —CH$_3$ | —COOCH$_3$ | —CH$_2$CH—CONHCH$_3$ (11.5) | —CH$_2$CH—CONH-C$_6$H$_4$-COOH | 68.3/28/3/0.7 |
| 7 | P-7 | " | —C$_6$H$_5$ | —CH$_2$CH—CON(morpholino) (11.2) | —CH$_2$CH—C$_6$H$_4$-SO$_2$H | 81.7/15/2.5/0.8 |

TABLE A-continued $$HOOC(CH_2)_2C\left[\begin{array}{c}CH_3\\|\\C\\|\\CN\end{array}\right]\left(CH_2-\underset{\underset{COOR_1}{|}}{\overset{\overset{CH_3}{|}}{C}}\right)_k(CH_2CH)_l(X)_m(Y)_n$$
$$\phantom{HOOC(CH_2)_2C\left[\begin{array}{c}CH_3\\|\\C\\|\\CN\end{array}\right]\left(CH_2-\underset{COOR_1}{C}\right)_k}\overset{|}{T}$$

| Synthesis Example No. | [P] | —R₁ | —T | —X— (SP) | —Y— | k/l/m/n (by weight) |
|---|---|---|---|---|---|---|
| 8 | P-8 | " | —C₆H₄CH₃ (p-tolyl) | —CH₂—CH—COCH₃ (9.2) | —CH₂CH—C₆H₄—COOH | 79.5/10/10/0.5 |
| 9 | P-9 | —C₂H₅ | —C₆H₅ | —CH₂—CH—CON(CH₃)₂ (10.6) | —CH₂—C(CH₃)₂—COO(CH₂)₂OCO(CH₂)₂COOH | 86.2/10/3/0.8 |
| 10 | P-10 | —CH₂C₆H₅ | " | —CH₂—CH—CHO (10.6) | —CH₂C—C=O / H₂C—C=O (succinic anhydride group) | 75/22/2/1.0 |

SYNTHESIS EXAMPLE 11

Synthesis of Binder Resin (P-11):

A mixture comprising 71.9 g of methyl methacrylate, 25 g of methyl acrylate, 2.0 g of acrylonitrile (having SP of 11.1 ), 0.7 g of methacrylic acid, 0.4 g of thiosalicylic acid, 180 g of toluene and 20 g of isopropanol was heated up to 65° C. with stirring in a nitrogen stream. 0.5 g of 2,2'-azobis(isobutyronitrile) (A.I.B.N) was added thereto and reacted for 4 hours. 0.3 g of A.I.B.N. was further added thereto and reacted for further 3 hours. Thereafter, 0.3 g of A.I.B.N. was added thereto before adjusting the temperature at 80° C. and reacted for 3 hours. The thus-obtained polymer resin (P-11) of the following structural formula had Mw of $6.5 \times 10^4$.

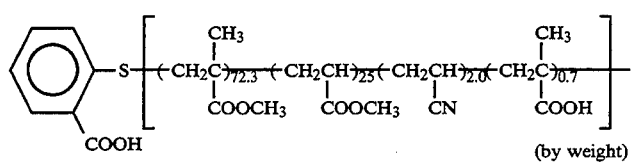

(by weight)

SYNTHESIS EXAMPLES 12 TO 16

Synthesis of Binder Resins (P-12) to (P-16):

Polymer resins (P-12) to (P-16) were prepared in the same manner as in Synthesis Example 11, except that the mercapto compound as indicated in Table B below was used in place of thiosalicylic acid. The thus-obtained polymers had Mw falling within the range of from $6 \times 10^4$ to $7.5 \times 10^5$.

TABLE B $$W-S-[-(CH_2-\underset{COOCH_3}{\underset{|}{\overset{CH_3}{\overset{|}{C}}}})-(CH_2CH)-(CH_2CH)-(CH_2\underset{COOH}{\underset{|}{\overset{CH_3}{\overset{|}{C}}}})-]-$$
(with COOH, CN substituents)

| Synthesis Example No. | [P] | Mercapto Compound | W— |
|---|---|---|---|
| 12 | P-12 | HOOC(CH$_2$)$_2$SH | HOOC(CH$_2$)$_2$— |
| 13 | P-13 | HOOC—CH—SH<br>            \|<br>HOOC—CH$_2$ | HOOC—HC—<br>          \|<br>HOOC—CH$_2$ |
| 14 | P-14 | HO$_3$S(CH$_2$)$_2$SH | HO$_3$S(CH$_2$)$_2$— |
| 15 | P-15 | HO—P(=O)(OH)—O(CH$_2$)$_2$SH | HO—P(=O)(OH)—O(CH$_2$)$_2$— |
| 16 | P-16 | (phthalic-CONH(CH$_2$)$_2$SH) | (phthalic-CONH(CH$_2$)$_2$—) |

SYNTHESIS EXAMPLES 17 TO 19

Synthesis of Binder Resins (P-17) to (P-19):

Polymer resins (P-17) to (P-19) were prepared in the same manner as in Synthesis Example 1, except that the compound as indicated in Table C below was used as the initiator in place of A.C.V. The thus-obtained polymers had Mw falling within the range of from $8 \times 10^4$ to $9 \times 10^4$.

TABLE C

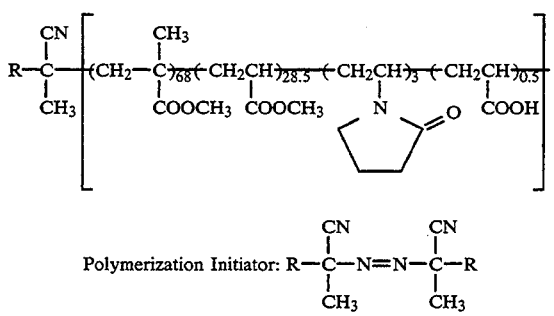

[P-11]:

| Synthesis Example No. | [P] | R— |
|---|---|---|
| 17 | P-17 | HO$_3$S—⌬—NHCO(CH$_2$)$_2$— |
| 18 | P-18 | 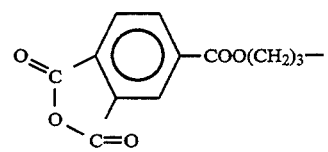 |

TABLE C-continued

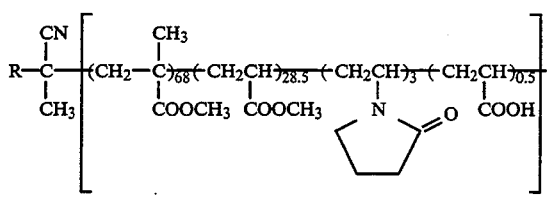

(having SP of 11.0), 0.3 g of acrylic acid, 0.4 g of 2-carboxyethyl N,N-diethyldithiocarbamate and 100 g of tetrahydrofuran was put in a closed vessel filled with nitrogen and heated up to 50° C. This was exposed to a high-pressure mercury lamp of 400 W with a distance of 10 cm therebetween through a glass filter, for 8 hours for photopolymerization.

The reaction product was re-precipitated in 2 liters of methanol, and the precipitates were collected and dried. The thus-obtained polymer of the following structural formula weighed 80 g and had Mw of $1.0 \times 10^5$.

[P-20]:

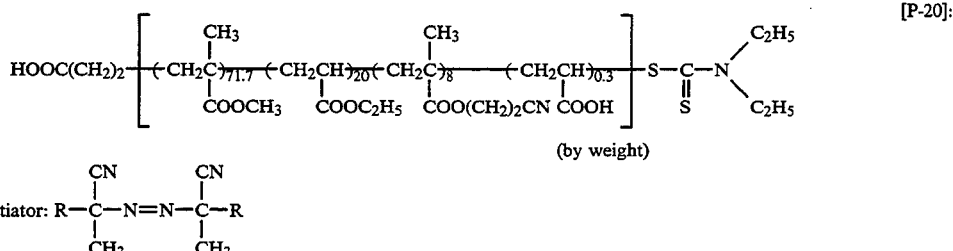

(by weight)

Polymerization Initiator:

$$R\!-\!\underset{\underset{CH_3}{|}}{\overset{\overset{CN}{|}}{C}}\!-\!N\!=\!N\!-\!\underset{\underset{CH_3}{|}}{\overset{\overset{CN}{|}}{C}}\!-\!R$$

| Synthesis Example No. | [P] | R— |
|---|---|---|
| 19 | P-19 | HO—P(=O)(OH)—(CH₂)₂NHCO(CH₂)₂— |

SYNTHESIS EXAMPLE 20

Synthesis of Binder Resin (P-20):

A mixture comprising 71.7 g of methyl methacrylate, 20 g of ethyl acrylate, 8 g of 2-cyanoethyl methacrylate

SYNTHESIS EXAMPLES 21 TO 30

Synthesis of Binder Resins (P-21) to (P-30):

Polymer resins (P-21) to (P-30) were prepared in the same manner as in Synthesis Example 20, except that 4 g of the monomer (corresponding to the polymer component (c)) and $1.8 \times 10^{-3}$ mol of the photopolymerization initiator both indicated in Table D below were used in place of 8 g of 2-cyanoethyl methacrylate (corresponding to the polymer component (c)) and 0.4 g of the photo-polymerization initiator 2-carboxyethyl N,N-diethyldithiocarbamate, respectively. The thus-obtained polymers had Mw falling within the range of from $1 \times 10^5$ to $2.5 \times 10^5$.

TABLE D $$R\left[\left(CH_2C\begin{matrix}CH_3\\|\\COOCH_3\end{matrix}\right)\left(CH_2CH\atop COOC_2H_5\right)\left(Y\right)\left(CH_2CH\atop COOH\right)\right]Z$$

| Synthesis Example No. | Photopolymerization Initiator [P] | R— | —Y— (SP) | —Z |
|---|---|---|---|---|
| 21 | P-21 | (structure with COO(CH₂)₂ on benzene ring with two C=O groups) | —CH₂CH— with CH₃ / CON(CH₃)₂ (10.6) | —S—C(=S)—N(CH₃)₂ |
| 22 | P-22 | C₄H₉— | —CH₂C(CH₃)₂—COO(CH₂CH₂O)₂—CH₃ (9.11) | —S—C(=S)—N((CH₂)₂COOH)(CH₃) |
| 23 | P-23 | HO₃S(CH₂)₄— | —CH₂CH(CH₃)—CONHC₆H₅ (12.0) | —S—C(=S)—N(C₂H₅)₂ |
| 24 | P-21 | HO-P(=O)(OH)-(CH₂)₆— | —CH₂C(CH₃)₂—COO(CH₂)₂SCH₃ (9.7) | —S—C(=S)—N(C₄H₉)₂ |
| 25 | P-25 | HOOC(CH₂)₃— | —CH₂C(CH₃)₂—COOCH₂CHCH₂ with OCOCH₃ / OCOCH₃ (10.2) | —S—C(=S)—O—CH(CH₃)₂ |

TABLE D-continued $$R-\left[-(CH_2\underset{\underset{COOCH_3}{|}}{\overset{\overset{CH_3}{|}}{C}})-(CH_2CH)-(Y)-(CH_2CH)-\right]-Z$$
$$\phantom{R-[-(CH_2C)-}COOC_2H_5\phantom{-(Y)-(CH_2CH)-}COOH$$

| Synthesis Example No. | Photopolymerization Initiator [P] | R— | —Y— (SP) | —Z |
|---|---|---|---|---|
| 26 | P-26 | ![structure with CONH(CH₂)₂S-C(=S)-N(C₄H₉)₂ on benzene with SO₃H]<br>Structure: benzene ring with CONH(CH₂)₂S—C(=S)—N(C₄H₉)(C₄H₉) and SO₃H substituents | benzene ring with CONH(CH₂)₂ and SO₃H | $-CH_2-\underset{\underset{COO(CH_2)_2NHCONHCH_3}{|}}{\overset{\overset{CH_3}{|}}{C}}-$ (10.2) | $-S-\underset{\underset{S}{\|}}{C}-N\underset{C_4H_9}{\overset{C_4H_9}{<}}$ |
| 27 | P-27 | $C_5H_{11}-S-\underset{\underset{S}{\|}}{C}-N\underset{(CH_2)_2COOH}{\overset{(CH_2)_2COOH}{<}}$ | $C_5H_{11}-$ | $-CH_2-\underset{\underset{COO(CH_2)_2COOCH_3}{|}}{\overset{\overset{CH_3}{|}}{C}}-$ (9.8) | $-S-\underset{\underset{S}{\|}}{C}-N\underset{(CH_2)_2COOH}{\overset{(CH_2)_2COOH}{<}}$ |
| 28 | P-28 | benzene ring with HOOC, HOOC, and CONH(CH₂)₄S—C(=S)—N(C₃H₇)₂ | benzene ring with CONH(CH₂)₄—, HOOC, HOOC substituents | $-CH_2-\underset{\underset{COO(CH_2)_3SO_2CH_3}{|}}{\overset{\overset{CH_3}{|}}{C}}-$ (9.9) | $-S-\underset{\underset{S}{\|}}{C}-N\underset{C_3H_7}{\overset{C_3H_7}{<}}$ |
| 29 | P-29 | $\underset{\underset{OH}{|}}{\overset{\overset{O}{\|}}{HO-P}}-O(CH_2)_2S-\underset{\underset{S}{\|}}{C}-N\underset{C_4H_9}{\overset{C_4H_9}{<}}$ | $\underset{\underset{OH}{|}}{\overset{\overset{O}{\|}}{HO-P}}-O(CH_2)_2-$ | $-CH_2-CH-$ benzene ring with $SO_2NHC_3H_7$ (10.0) | $-S-\underset{\underset{S}{\|}}{C}-N\underset{C_4H_9}{\overset{C_4H_9}{<}}$ |
| 30 | P-30 | $HOOC(CH_2)_2S-\underset{\underset{S}{\|}}{C}-OC_4H_9$ | $HOOC(CH_2)_2-$ | $-CH_2-\underset{\underset{CONHSO_2-\text{Ph-}CH_3}{|}}{\overset{\overset{CH_3}{|}}{C}}-$ (12.1) | $-S-\underset{\underset{S}{\|}}{C}-OC_4H_9$ |

EXAMPLE 1

A mixture comprising 32 g of Binder Resin (P-1), 8 g of Binder Resin (B-1) having the following structural formula, 200 g of zinc oxide, 0.02 g of uranine, 0.035 g of Rose Bengale, 0.025 g of bromophenol blue, 0.18 g of p-hydroxybenzoic acid and 300 g of toluene was dispersed in a homogenizer at $7 \times 10^3$ rpm for 5 minutes to prepare a photosensitive composition. This was coated on a conductive paper support, which is used in photosensitive ELP-1G), with a wire bar in a dry amount of 25 g/m². After the coated layer became dry when touched with the hand, the layer was forcedly dried at 110° C. for 10 seconds. Subsequently, this was allowed to stand in the dark for 24 hours at 20° C. and 65% RH to form an electrophotographic photoreceptor sample.

Binder Resin (B-1):

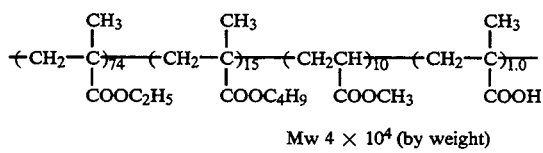

Mw $4 \times 10^4$ (by weight)

COMPARATIVE EXAMPLE 1

A comparative photoreceptor sample was formed in the same manner as in Example 1, except that 40 g of Binder Resin (B-1) only was used in place of using 32 g of Binder Resin (P-1) and 8 g of Binder Resin (B-1).

COMPARATIVE EXAMPLE 2

A comparative photoreceptor sample was formed in the same manner as in Example 1, except that 32 g of a comparative resin (R-1) having the following structural formula was used in place of 32 g of Binder Resin (P-1).

Comparative Resin (R-1):

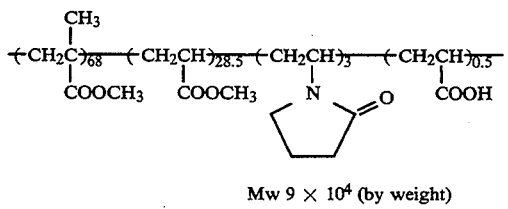

Mw $9 \times 10^4$ (by weight)

COMPARATIVE EXAMPLE 3

A comparative photoreceptor sample was formed in the same manner as in Example 1, except that 32 g of a comparative resin (R-2) having the following structural formula was used in place of 32 g of Binder Resin (P-1).

Comparative Resin (R-2):

-continued

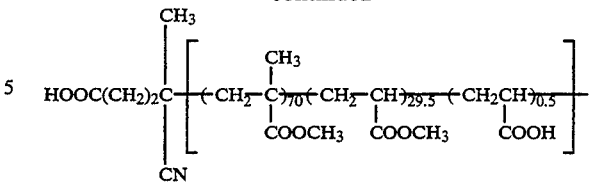

Mw $8.5 \times 10^4$ (by weight)

The thus-obtained photosensitive samples were tested with respect to their image-forming ability. They were formed into offset printing plates, which were also tested with respect to their printability. The test results obtained are shown in Table E below.

The samples were tested in the manner mentioned below.

(*1) Smoothness of Surface Layer:

Using a Beck smoothness tester (manufactured by Kumagaya Riko K.K.), the surface smoothness (sec/cc) of the photoreceptor samples was measured, based on one cc of the air capacity.

(*2) Image-forming Ability:

The photoreceptor samples were allowed to stand under the condition I (20° C. and 65% RH), the condition II (30° C. and 80% RH) or the condition III (15° C. and 30% RH) for one full day and then engraved with a full-automatic photoengraving machine EPL-404V (manufactured by Fuji Photo Film Co.) using a toner EPL-T. The duplicated images were evaluated with the naked eye with respect to the fog and the image quality. As the original for duplication (i.e., artwork original), used was a combination original that had been prepared by sticking a scrap from a different original onto the base original.

(*3) Water Retention of Printing Plate:

The photoreceptor samples were passed through an etching processor using an etchant EPL-EX (produced by Fuji Photo Film Co.) consisting essentially of phytic acid, diluted with the same volume of distilled water, whereby the surface of the photoconductive layer of each sample was etched. Each offset printing plate thus formed was located in an offset printer (Hamaduster 8005X Model, manufactured by Hamaduster Co.), and the 50th print from the start of the printing was checked with the naked eye with respect to the stains, if any, in the background.

(*4) Rubbing Resistance:

Two of the same photoreceptor samples were placed one upon another with the surface of the photoconductive layer of one sample facing to the back surface of another sample, a load of 100 g was applied to the lapped samples, and the upper sample was gradually drawn out in the horizontal direction. These samples were etched in the same manner as in (*3). The printing plates thus formed were used in offset printing, and the 10th print from the start of the printing was checked with the naked eye with respect to the stains, if any, in the rubbed area. (The test corresponds to a forced test of testing the resistance to rubbing of photoreceptor samples.)

(*5) Printing Durability:

The photoreceptor samples were photoengraved under the same conditions as those in the above-mentioned (*2) to form thereon toner images. These were then etched by passing two times through the etching processor of (*3) using ELP-EX. Each of the offset printing plates thus formed was mounted on an offset printing machine, which was run to obtain prints, using a wetting water ELP-F5X (produced by Fuji Photo Film Co.) consisting essentially of phytic acid. The printing was continued until occurrence of some troubles, and the number of good prints having no problem on the staining of the background area and on the image quality in the image area was counted. (The larger the number of good prints, the better the printing durability.)

the etching of zinc oxide was retarded due to the too strong interaction between the binder resin used and zinc oxide (or the too strong adhesion of the resin to zinc oxide) in Comparative Examples 1 and 3.

Regarding the rubbing resistance of the photoreceptor samples, only the sample of the present invention (Example 1) was good, while the samples of Comparative Examples were all bad, causing stains in the background area corresponding to the rubbed regions.

From the above-mentioned results, it is understood

TABLE E

|  | Example 1 | Comparative Example 1 | Comparative Example 2 | Comparative Example 3 |
|---|---|---|---|---|
| Smoothness of Photoconductive Layer (sec/cc) (*1) | 180 | 170 | 160 | 175 |
| Image-forming Ability (*2) | | | | |
| I (20° C., 65% RH) | Good. | Good. | Density in solid area was somewhat uneven. | Good. |
| II (30° C., 80% RH) | Good. | Good. | Densities in the solid area and the halftone area were uneven. | Good. |
| III (15° C., 30% RH) | Good. | Good. | Density in the solid area was uneven, and the solid area had white spots. | Good. |
| Water Retention of Printing Plate (*3) | Good. | Background stained greatly. | Good | Background stained. |
| Rubbing Resistance (*4) | Good. | Prints stained greatly. | Prints stained greatly. | Prints stained slightly. |
| Printing Durability (*5) | More than 3000 good prints obtained. | No print free from stains in the background was obtained. | No print free from stains in the background was obtained. | No print free from stains in the background was obtained. |

As is shown in Table E above, the photoreceptor sample of the present invention (Example 1) and the samples of Comparative Examples 1 and 3 had good reproducibility of reproducing duplicated images. Their good reproducibility was stable irrespective of the change of the ambient conditions from high temperature-high humidity to low temperature-low humidity. However, the photoreceptor sample of Comparative Example 2 resulted in insufficiency in the image area under severe conditions (Conditions II, III). This is considered because the insufficient interaction between the comparative resin (R-1) used and zinc oxide could not satisfy the electrostatic characteristic of the photoreceptor sample.

After the photoreceptor samples were etched to form offset printing plates, and the printing capacity of the plates was investigated. In view of the results of the water retention of the printing plates, the photoreceptor sample of the present invention (Example 1) and the sample of Comparative Example 2 were sufficiently etched to the result that the prints obtained were not stained. However, the prints obtained in Comparative Examples 1 and 3 stained noticeably in the background area due to adhesion of ink to the insufficiently etched areas of the printing plates. This is considered because that only the photoreceptor sample of the present invention was good with respect to the image-forming ability, the hydrophilicity after etching (water retention of printing plate), and the rubbing resistance. When the printing plate formed from the sample of the present invention was used in actual printing, though having a paper support, more than 3000 good prints were obtained.

EXAMPLE 2

A mixture comprising 28 g of Resin (P-11), 12 g of binder resin (B-2) having the following structural formula, 200 g of photoconductive zinc oxide, 0.017 g of methine dye (I) having the following structural formula, 0.18 g of phthalic anhydride and 300 g of toluene was dispersed in a homogenizer (manufactured by Nippon Seiki K.K.) at $8 \times 10^3$ rpm for 3 minutes to prepare a photosensitive composition. The coating composition was coated on a conductive paper support with a wire bar in a dry amount of 25 g/m². After the coated lyer became dry when touched with the hand, it was forcedly dried at 100° C. for 15 seconds. Subsequently, this was allowed to stand in the dark for 24 hours at 20° C. and 65% RH to form an electrophotographic photoreceptor sample.

Binder Resin (B-2):

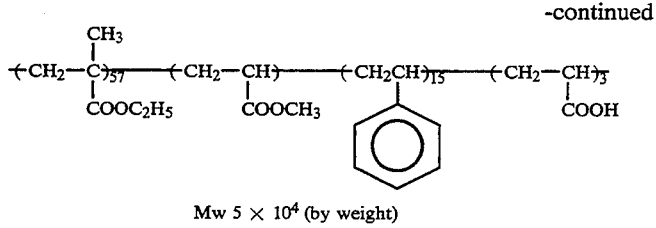

Mw 5 × 10⁴ (by weight)

Methine Dye (I):

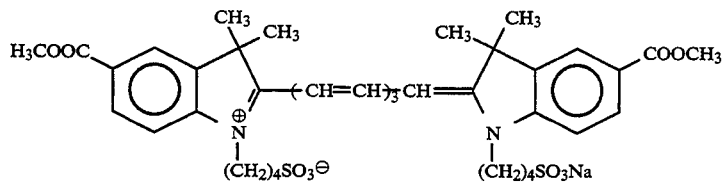

The same test were conducted as those in Example 1, but the image-forming ability was evaluated in the manner mentioned below.

(*6) Image-forming Ability:

The photoreceptor sample was allowed to stand under the condition mentioned above for one full day. This was charged at −6 kV and exposed to a laser ray (780 nm) from a 2.8 mW-power gallium-aluminium-arsenic semiconductor laser, the irradiation to the surface of the sample being 64 erg/cm², for rapid exposure at a pitch of 25 μm and a scanning rate of 300 m/sec. The thus-exposed sample was then developed with a liquid developer ELP-T (produced by Fuji Photo Film Co.).

The fixation of the toner image thus formed was conducted at 60° C. for 30 seconds.

The test results are shown in Table F below.

TABLE F

| | Example 2 |
|---|---|
| Smoothness of Photoconductive Layer (sec/cc) | 190 |
| Image-forming Ability (*6) | |
| I | Good. |

TABLE F-continued

| | Example 2 |
|---|---|
| II | Good. |
| III | Good. |
| Water Retention of Printing Plate | Good. |
| Rubbing Resistance | Good. |
| Printing Durability | More than 3000 good prints obtained. |

As is shown in Table F above, the photoreceptor sample of the present invention had good image reproducibility even though a duplicated image was formed thereon by scanning exposure using a low-power semiconductor laser ray. In addition, the offset printing plate formed from the sample also had good properties.

EXAMPLES 3 TO 6

Electrophotographic photoreceptor samples were prepared in the same manner as in Example 2, except that 28 g of (P-17) and 18 g of (B-3) having the following structural formula were used as the binder resins in place of 28 g of (P-11) and 12 g of (B-2) and that the dye as indicated in Table G below was used in place of the methine dye (I).

Resin (B-3):

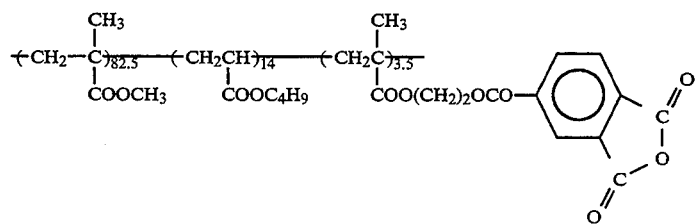

Mw 4.5 × 10⁴ (by weight)

TABLE G

| Example No. | Dye | Chemical Structure |
|---|---|---|
| 3 | [II] | ![structure] |

TABLE G-continued

| Example No. | Dye | Chemical Structure |
|---|---|---|
| 4 | [III] | 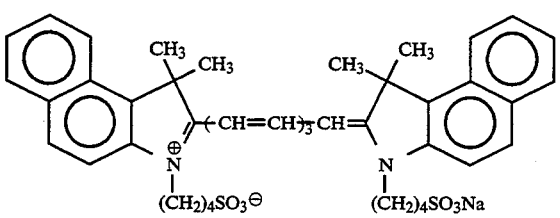 |
| 5 | [IV] | 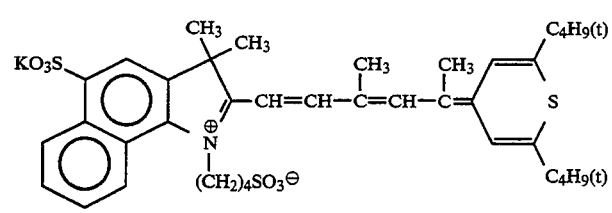 |
| 6 | [V] | 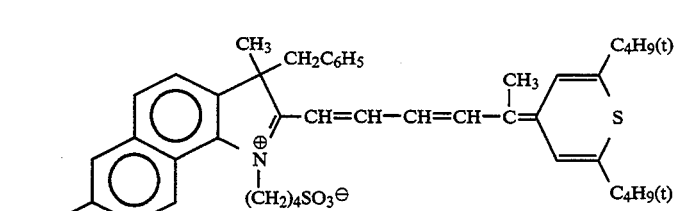 |

All the photoreceptor samples of the present invention reproduced good and sharp duplicated images which were free from background fogging, even though the ambient conditions varied.

The samples were formed into offset printing plates and the plates had good printability, like the printing plate formed in Example 2.

EXAMPLES 7 TO 24

Electrophotographic photoreceptor samples were prepared in the same manner as in Example 1, except that 32 g of the resin (P) as indicated in Table H below was used in place of 32 g of Resin (P-1).

TABLE H

| Example No. | Resin (P) | Example No. | Resin (P) |
|---|---|---|---|
| 7 | P-2 | 16 | P-7 |
| 8 | P-3 | 17 | P-8 |
| 9 | P-4 | 18 | P-9 |
| 10 | P-5 | 19 | P-10 |
| 11 | P-6 | 20 | P-14 |
| 12 | P-24 | 21 | P-28 |

TABLE H-continued

| Example No. | Resin (P) | Example No. | Resin (P) |
|---|---|---|---|
| 13 | P-25 | 22 | P-29 |
| 14 | P-26 | 23 | P-30 |
| 15 | P-27 | 24 | P-17 |

All the photoreceptor samples of the present invention reproduced good and sharp duplicated images which were free from background fogging, even though the ambient conditions varied.

The samples were formed into offset printing plates and the plates had good printability, like the printing plate formed in Example 1.

EXAMPLES 25 TO 31

Electrophotographic photoreceptor samples were prepared in the same manner as in Example 1, except that 32 g of the resin (P) and 8 g of the resin (B) both as indicated in Table I below were used in place of 32 g of Resin (P-1) and 8 g of Resin (B-1).

TABLE I

| Example No. | Resin (B) | Chemical Structure of Resin (B) (by weight) Mw | Resin (P) |
|---|---|---|---|
| 25 | B-4 | 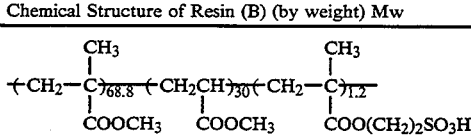 | P-15 |

TABLE I-continued

| Example No. | Resin (B) | Chemical Structure of Resin (B) (by weight) Mw | Resin (P) |
|---|---|---|---|
| 26 | B-5 | $\text{-(CH}_2\text{-C(CH}_3\text{))}_{63}\text{-(CH}_2\text{CH(COOC}_2\text{H}_5\text{))}_{20}\text{-(CH}_2\text{CH(COOC}_2\text{H}_5\text{))}_{16}\text{-(CH}_2\text{CH(C}_6\text{H}_4\text{CH}_3\text{))}_{-}\text{-(CH}_2\text{-C(CH}_3\text{)(COO(CH}_2\text{)}_2\text{OP(O)(OH)}_2\text{))}_{1.0}\text{-}$; $5 \times 10^4$ | P-16 |
| 27 | B-6 | $\text{-(CH}_2\text{-C(CH}_3\text{)(COOC}_3\text{H}_7\text{))}_{73.5}\text{-(CH}_2\text{CH(COOCH}_2\text{C}_6\text{H}_5\text{))}_{15}\text{-(CH}_2\text{CH(OCOCH}_3\text{))}_{10}\text{-(CH}_2\text{CH(CONH-C}_6\text{H}_4\text{-COOH))}_{1.5}\text{-}$; $3.8 \times 10^4$ | P-19 |
| 28 | B-7 | $\text{-(CH}_2\text{-C(CH}_3\text{)(COOCH}_3\text{))}_{65.2}\text{-(CH}_2\text{CH(COOCH}_3\text{))}_{25}\text{-(CH}_2\text{-C(CH}_3\text{)(COOCH}_2\text{CH(C}_2\text{H}_5\text{)C}_4\text{H}_9\text{))}_{8}\text{-(CH}_2\text{CH(COOH))}_{1.8}\text{-}$; $4.5 \times 10^4$ | P-20 |
| 29 | B-8 | $\text{-(CH}_2\text{-C(CH}_3\text{)(COOCH}_3\text{))}_{30}\text{-(CH}_2\text{CH(COOC}_2\text{H}_5\text{))}_{52.5}\text{-(CH}_2\text{CH(C}_6\text{H}_5\text{))}_{15}\text{-(CH}_2\text{-C(CH}_3\text{)(COOH))}_{2.5}\text{-}$; $5 \times 10^4$ | P-21 |
| 30 | B-9 | $\text{-(CH}_2\text{-C(CH}_3\text{)(COOC}_4\text{H}_9\text{))}_{88}\text{-(CH}_2\text{C(CH}_3\text{)(COO(CH}_2\text{)}_2\text{OH))}_{8}\text{-(CH}_2\text{-C(CH}_3\text{)(COO(CH}_2\text{)}_2\text{OCO(CH}_2\text{)}_2\text{COOH))}_{4}\text{-}$; $4.5 \times 10^4$ | P-23 |
| 31 | B-10 | $\text{-(CH}_2\text{-C(CH}_3\text{)(COOC}_2\text{H}_5\text{))}_{80.7}\text{-(CH}_2\text{CH(COOCH}_3\text{))}_{18}\text{-(CH}_2\text{CH(COOH))}_{1.3}\text{-}$; $3.8 \times 10^4$ | P-25 |

All the photoreceptor samples of the present invention reproduced good and sharp duplicated images which were free from background fogging, even though the ambient conditions varied.

The samples were formed into offset printing plates and the plates had good printability, like the printing plate formed in Example 1.

As has been mentioned in detail in the above, the present invention provides an electrophotolithographic plate precursor which may be formed into an offset printing plate. Specifically, the plate precursor may be etched excellently to be an offset printing plate which will not generate not only fine stains throughout on the background of prints but also pepper stains locally thereon. The plate precursor may be etched with a combination of an etchant and a wetting water both having no problem in the environmental sanitation. The printing plate thus formed after the etching has high printing durability.

In addition, the printing plate formed from the plate precursor has high printing durability (or has excellent rubbing resistance) and does not cause background staining, even though using a support that may be suitably fed to a full-automatic offset printing machine.

What is claimed is:

1. An electrophotolithographic plate precursor having on a conductive support at least one photoconductive layer containing at least a photoconductive zinc oxide, a color sensitizing dye and a binder resin, in which the binder resin contains at least one binder resin (P): the binder resin (P) being a random copolymer (i) having a weight average molecular weight of from $5 \times 10^4$ to $5 \times 10^5$, (ii) comprising (a) a polymer component having repeating units of the following formula (I) in an amount of 50% by weight or more, (b) a polymer component containing at least one polar group selected from the group consisting of $-PO_3H_2$, $-COOH$, $-SO_3H$, $-SO_2H$ and cyclic acid anhydride-containing groups, in an amount of from 0.1 to 10% by weight, and (c) a polymer component having a Fedors' solution parameter of 9.0 or more and containing at least one aprotic polar group, in an amount of from 0.5 to 10% by weight, and (iii) having at least one polar group selected from the group consisting of $-PO_3H_2$, $-COOH$, —SO₃H, —SO₂H and cyclic acid anhydride-containing groups at one end of the main chain of the copolymer:

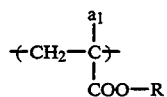

where $a_1$ represents a hydrogen atom or a methyl group; and R represents an alkyl group having from 1 to 4 carbon atoms or an aromatic group.

2. The electrophotolithographic plate precursor as claimed in claim 1, wherein the content of the binder resin (P) is 50% by weight or more based on the total weight of the binder resin in the photoconductive layer.

3. The electrophotolithographic plate precursor as claimed in claim 1, wherein the content of the binder resin (P) is from 60 to 90% by weight based on the total weight of the binder resin in the photoconductive layer.

4. The electrophotolithographic plate precursor as claimed in claim 1, wherein the content of the polymer component (a) is from 70 to 98.8% by weight.

5. The electrophotolithographic plate precursor as claimed in claim 1, wherein the content of the polymer component (b) is from 0.2 to 10% by weight.

6. The electrophotolithographic plate precursor as claimed in claim 1, wherein the content of the polymer component (c) is from 1 to 8% by weight.

* * * * *